United States Patent [19]
Hall et al.

[11] Patent Number: 5,607,530
[45] Date of Patent: Mar. 4, 1997

[54] POLYMER DIVERTER SYSTEM FOR METAL PIPE HAVING AN INTEGRALLY FORMED POLYMER LINER

[75] Inventors: Robert E. Hall; James R. Andre; J. K. Leason, all of Newport Beach, Calif.

[73] Assignee: W.E. Hall Company, Newport Beach, Calif.

[21] Appl. No.: 512,989

[22] Filed: Aug. 9, 1995

[51] Int. Cl.⁶ .......................... B29C 47/70; B29C 47/74
[52] U.S. Cl. .................. 156/143; 156/244.11; 156/356
[58] Field of Search .................. 156/143, 244.11, 156/356, 357; 425/140, 145, 185

[56] References Cited

U.S. PATENT DOCUMENTS

| 3,126,306 | 3/1964 | Sherman. | |
|---|---|---|---|
| 3,247,692 | 4/1966 | Davis. | |
| 3,712,782 | 1/1973 | Burlis | 425/145 |
| 3,721,597 | 3/1973 | Colburn. | |
| 3,868,433 | 2/1975 | Bartz et al.. | |
| 3,877,136 | 4/1975 | Groch et al.. | |
| 4,069,092 | 1/1978 | Zink | 156/500 |
| 4,255,367 | 3/1981 | Wallace | 425/145 |
| 4,472,475 | 9/1984 | Decroix. | |
| 4,575,400 | 3/1986 | Ueda et al.. | |
| 4,689,174 | 8/1987 | Lupke. | |
| 4,763,830 | 8/1988 | Davis. | |
| 4,838,317 | 6/1989 | Andre et al.. | |
| 5,066,444 | 11/1991 | Behr | 156/244.11 |
| 5,238,385 | 8/1993 | Johnson | 425/185 |
| 5,316,606 | 5/1994 | Andre | 156/201 |
| 5,480,505 | 1/1996 | Andre | 156/244.11 |

FOREIGN PATENT DOCUMENTS 5551526  4/1980  Japan.

OTHER PUBLICATIONS

Modern Plastic Encyclopedia, Mid–Oct. 1990 issue, vol. 67, No. 11, pp. 70 and 823.
Adhesives Age, Feb. 1985, vol. 28, No. 2, pp. 6 and 8.

*Primary Examiner*—Daniel Stemmer
*Attorney, Agent, or Firm*—Stetina Brunda & Buyan

[57] ABSTRACT

An apparatus for applying polymer to metal pipe during the pipe forming process has a pump for pumping the polymer, a first extruder die receiving polymer from the pump and configured to apply polymer to metal pipe as the metal pipe is being formed from metal stock, and a second extruder die for forming pipe couplers. A valve effects diversion of the polymer from the first extruder die to the second extruder die when a stoppage of the pipe forming process occurs.

7 Claims, 3 Drawing Sheets

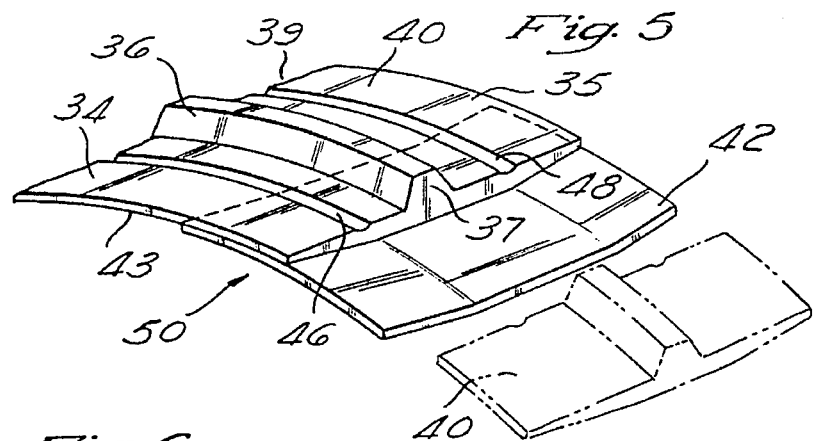
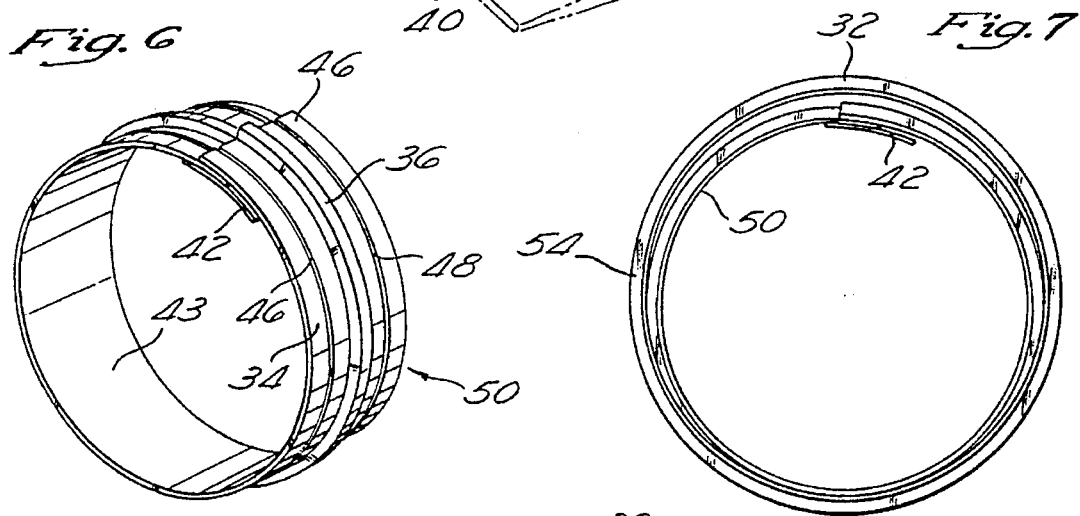
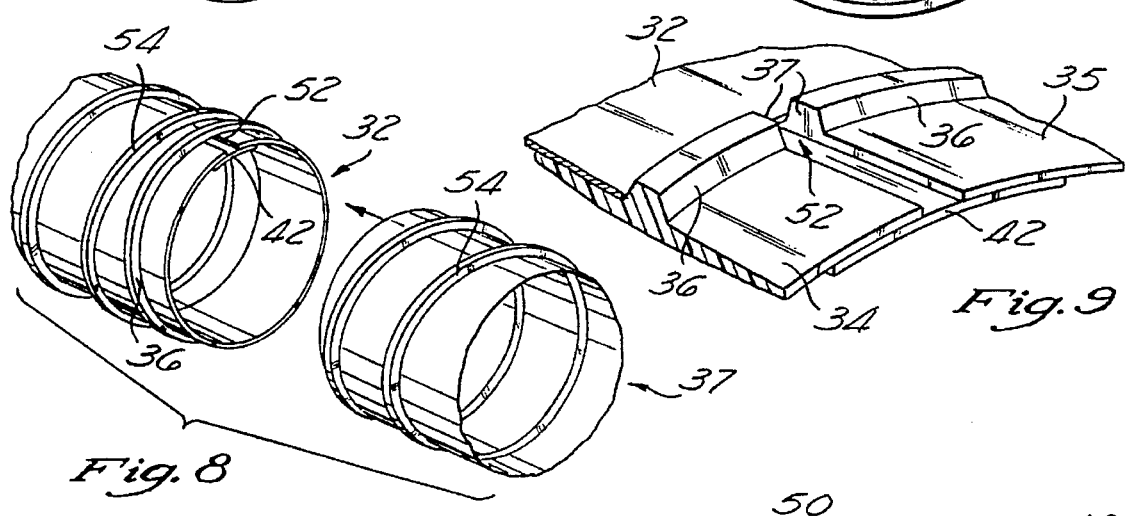
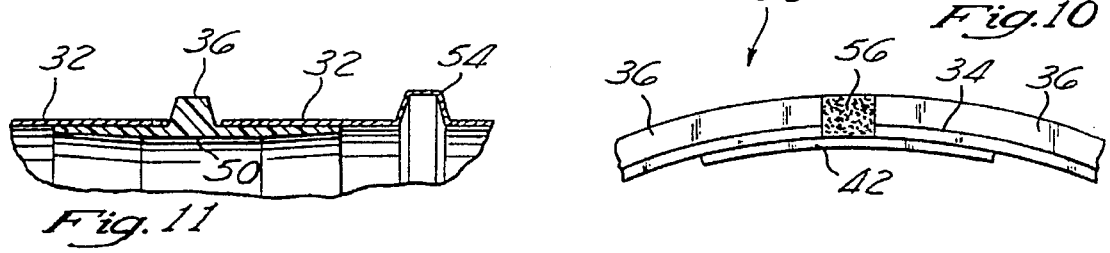

POLYMER DIVERTER SYSTEM FOR METAL PIPE HAVING AN INTEGRALLY FORMED POLYMER LINER

FIELD OF THE INVENTION

The present invention relates generally to pipe manufacturing processes and more particularly to a polymer diverter system for use in the manufacturing of metal pipe having an integrally formed polymer liner wherein polymer is continuously applied to the metal pipe during the forming process thereof, until the metal stock from which the pipe is being formed is depleted. When such depletion causes a lack of metal pipe onto which to apply further polymer, then the polymer is diverted for other uses, e.g., the injection molding or extruding of another product. Such diversion of the polymer prevents undesirable interruption in the polymer feeding process and eliminates the need to repelletize unused solidified polymer material.

BACKGROUND OF THE INVENTION

The application of polymers to metal, particularly during the pipe forming process, is well known. Polymer liners are applied to the inner and/or outer surfaces of metal pipes to prevent corrosion and increase the durability and flow characteristics thereof.

Examples of processes for fabricating metal pipe with such a polymer liner are provided in U.S. Pat. No. 5,316,606 issued on May 31, 1994 to Andre and U.S. Ser. No. 08/225,440, filed on Apr. 8, 1994, the contents of both of which are hereby incorporated by reference.

A substantial problem associated with the extrusion of a polymer in such processes concerns what to do with the polymer when a stoppage of the metal pipe forming process occurs, such as happens during a mechanical failure or when the metal stock is depleted and must be replenished.

The polymer extrusion process cannot simply be halted during such stoppages because the polymer contained within the extruder screw and the piping intermediate the extruder screw and the extruder film die then would tend to overheat, and thus become unusable for subsequent application. Such overheating would occur because of the heat generated by the extruder screw and any external heaters, if utilized. It is not possible to merely stop the extruder screw and/or turn off any heaters since such action would result in undesirable hardening of the polymer within the extruder screw and pipes. Thus, the flow of polymer through the extruder screw and pipes must remain substantially continuous.

One solution is to direct the polymer to a repelletizing apparatus wherein the polymer is permitted to solidify and is then ground or repelletized such that it may subsequently be once again plasticized via the extruder screw and used in the extrusion process. However, such repelletizing apparatus are costly. Further, such reuse of the repelletized polymer involves the undesirable repetition of the melting and extruding processes. Such repetition is undesirable primarily because of the inefficiency in having to repeatedly melt the polymer. Further, such repetition causes undesirable and unnecessary wear and tear on the equipment utilized.

Additionally, the application of a desired thickness of polymer onto the surface of the metal pipe is substantially dependent upon maintenance of both the speed with which the metal is supplied to the pipe forming apparatus and the volume of polymer which is extruded through the polymer film die. This interdependency of the speed with which metal is provided and the extruded polymer volume makes it undesirable to allow changes in the extruder volume, such as by halting the flow of polymer during stoppage of the pipe forming process, for example. Such changes necessitate that the extruder volume be accurately readjusted to facilitate the resumed application of polymer to the metal pipe. Thus, it is undesirable to halt the flow of polymer from the extruder screw, since the desired flow rate would have to be re-established upon resuming the extruding process.

As such, it is desirable to provide an apparatus for diverting polymer flow from the extruder head such that polymer flow may be maintained during temporary stoppage of the pipe forming apparatus. It is further desirable to provide a desirable use for the polymer so diverted, such that the polymer need not be either repelletized or wasted.

SUMMARY OF THE INVENTION

The present invention specifically addresses and alleviates the above-mentioned deficiencies associated with the prior art. The present invention comprises a method for applying polymer to metal, the method comprising the steps of pumping heated polymer to an applicator and applying the heated polymer to the metal via the applicator. Upon encountering a lack of metal to which the polymer is to be applied, the pumped heated polymer is diverted from the applicator and utilized in a desirable fashion, e.g., for forming an article.

More particularly, the present invention comprises a method for applying polymer to metal pipe during the pipe forming process. The heated polymer is pumped to an extrusion film die from which it is extruded onto the metal pipe. Upon encountering a lack of metal pipe onto which to extrude further polymer, the pumped heated polymer is diverted from the extrusion film die and utilized to form a desired product or article. The diverted polymer is preferably utilized to form a splice for attaching two sections of pipe together. The splice may either be immediately formed about a mandrel, while still hot, so as to define a circular configuration thereof or stored in a flat configuration thereof and later formed about a mandrel. The splice and/or the mandrel are heated so as to facilitate such forming.

Thus, according to the present invention, polymer material is utilized in a desirable manner when a mechanical failure or depletion of metal stock requires temporary stoppage of the metal forming process. The expensive and undesirable polymer repelletization process is avoided.

These, as well as other advantages of the present invention, will be more apparent from the following description and drawings. It is understood that changes in the specific structure shown and described and may be made within the scope of the claims without departing from the spirit of the invention.

BRIEF DESCRIPTION OF THE DRAWINGS

FIG. 5 is a fragmentary perspective view showing the cut and formed extrudate section of FIG. 4 having a shelf attached thereto, thereby defining a coupling for attaching two pieces of pipe, such as that shown in FIG. 1, to one another;

FIG. 6 is a perspective view of the pipe coupler of FIG. 5;

FIG. 7 is an end view of the pipe coupler of FIG. 5 and 6, disposed partially within a pipe opening, prior to full expansion of the coupler;

FIG. 8 is a perspective view of the pipe and coupler of FIG. 7, showing a second pipe section positioned for attachment to the first pipe section via the coupler;

FIG. 9 is a enlarged fragmentary view of the first pipe section and coupler of FIG. 8, showing the gap formed between the two ends of the pipe coupler after it has been expanded to snugly fit into the first pipe section;

FIG. 10 is an end view of the coupler of FIGS. 8 and 9 wherein the gap has been filled with either grout or a polymer material;

FIG. 11 is a cross-sectional side view of the coupled first and second pipe sections of FIG. 8;

DETAILED DESCRIPTION OF THE PREFERRED EMBODIMENT

The detailed description set forth below in connection with the appended drawings is included as a description of the presently preferred embodiment of the invention, and is not intended to represent the only form in which the present invention may be constructed or utilized. The description sets forth the functions and sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

The polymer diverter system for metal pipe having an integrally formed polymer liner of the present invention is illustrated in FIGS. 1 thru 11 which depict a presently preferred embodiment of the invention.

Figure 1:
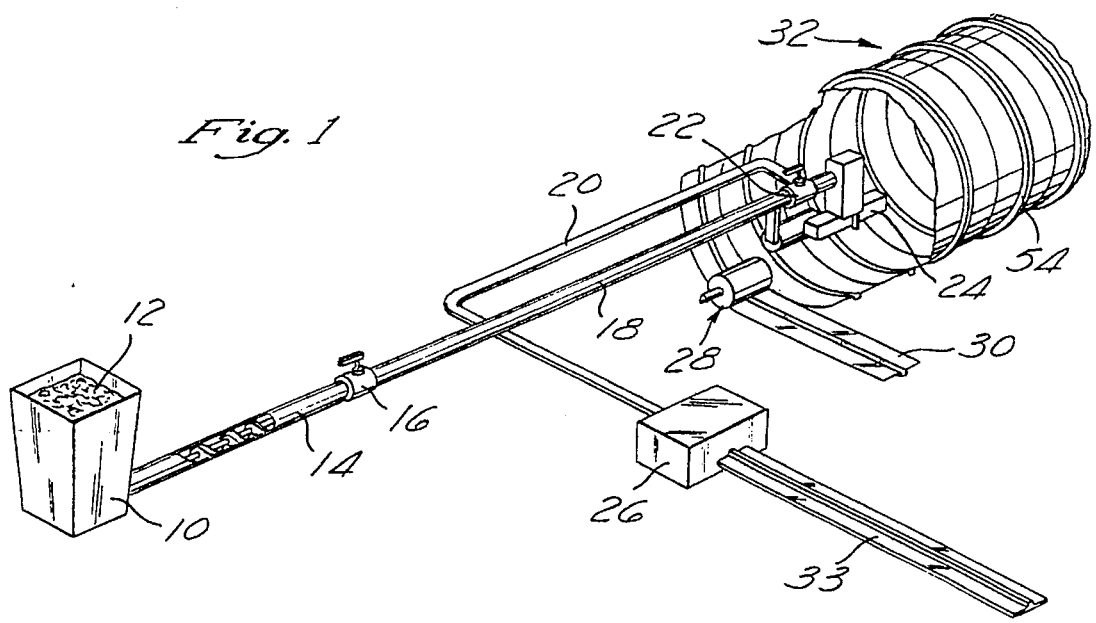
FIG. 1 is a perspective view of the polymer diverter system of the present invention.

Referring now to FIG. 1, the present invention generally comprises a hopper 10 into which a quantity of pelletized polymer 12 is disposed. An extruder screw 14 plasticizes the pelletized polymer 12 and pumps the plasticized polymer through first or on/off Valve 16 and first pipe 18 to first or film extruder 24 which applies a film or layer of the polymer to the interior surface of formed pipe 32. Alternatively, the polymer is optionally applied to the exterior surface of the formed pipe 32 or to both the interior and exterior surfaces thereof. The pipe 32 preferably has ribs 54 extending outwardly therefrom.

Heaters are optionally provided along the extruder screw 14 and/or first pipe 18 so as to facilitate plasticization of the polymer and maintain the polymer in a plasticized state prior to extrusion thereof, as required.

Metal stock 30 is formed into pipe 32 via pipe forming apparatus 28 as disclosed in previously recited U.S. Pat. No. 5,316,606 and U.S. patent application Ser. No. 08/225,440. The present invention is an improvement over the methodologies and apparatus disclosed therein.

Second or two-way valve 22, disposed along the first pipe 18 proximate the first extruder 24, facilitates re-routing or diverting of the polymer via second pipe 20 to second extruder 26, via which a length of extrudate 33 is formed. Thus, the two-way valve 22 routes the polymer to either the first extruder 24, or the second extruder 26, depending upon the position thereof. The length of extrudate 33 is subsequently formed into one or more couplings for attaching two pipe sections to one another, as discussed in detail below.

The two-way valve 22 may either be manually or automatically actuated. In the preferred embodiment of the present invention, the two-way valve 22 automatically diverts polymer to the second extruder die 26 in response to stoppage of the pipe forming process. Those skilled in the art will appreciate that various different mechanical and/or electrical methods are thus suitable for facilitating such automatic operation of the two-way valve 22. Further, according to the preferred embodiment of the present invention, the two-way valve 22 resumes application of the polymer to the metal 30 automatically when the pipe forming process commences.

Thus, an optional controller (not shown) may be utilized to sense stoppage of the pipe forming process and automatically actuate the first or two-position valve 22 so as to effect the diversion of the polymer from the first extruder die 24 to the second extruder die 26. The controller may optionally further sense resuming of the pipe forming process and effect re-routing of the polymer back to the first extrusion die 24.

The second extruder 26 is either utilized to form couplings for coupling pipe sections of the diameter currently being formed via the pipe forming apparatus 28 or is utilized to form pipe couplings for various other diameters and/or configurations of pipe.

Indeed, those skilled in the art will appreciate that the second extruder 26 may similarly be utilized to form various other articles, including those not intended for use in piping applications. Further, the methodology of the present invention may be utilized for applying polymer to various different non-pipe devices, while the diverted polymer is used to form various different articles via various different processes.

Figure 2:
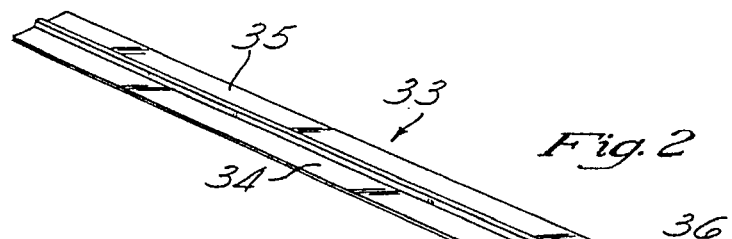
FIG. 2 is a perspective view of a length of extrudate as formed by the second extruder to which heated polymer is pumped during stoppage of the pipe forming apparatus.
Figure 3:
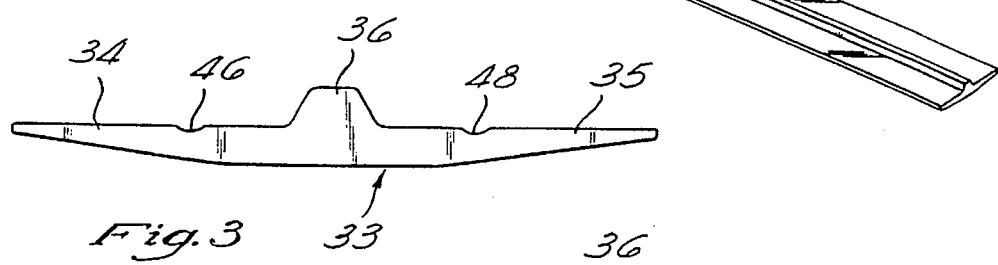
FIG. 3 is an end view of the length of extrudate of FIG. 2.

Referring now to FIGS. 2 and 3, the length of extrudate 33 generally comprises a raised central portion or ridge 36 which separates one surface (the upper surface, as illustrated) thereof into a first planar surface 34 and a second planar surface 35. According to the preferred embodiment of the present invention, a first channel 46 is formed in the first planar surface 34 and a second channel 48 is formed in the second planar surface 35 so as to decrease the amount of material, as well as the weight of the coupling, while maintaining adequate strength of the coupling- The first 46 and second 48 channels are optionally used to retain O-rings to enhance sealing of the coupled pipe sections. Those skilled in the art will appreciate that various other sealing means, e.g., packings, gaskets, bonding/sealing agents, etc., may similarly be disposed within the first 46 and second 48 channels, as desired. Those skilled in the art will appreciate that the dimensions, i.e., depth and width of the first 46 and second 48 channels are dependent upon the particular polymer utilized, the strength of the coupling required for particular piping applications, and what, if any, sealing means are to be disposed therein.

The extrudate 33 may either be cut to length and stored in a flat configuration thereof, as illustrated in FIG. 2, or, alternatively, may be formed about a mandrel so as to define a circularly configured pipe coupler, as discussed in detail below. If the extrudate 33 is stored flat, then the extrudate 33 may later, at a convenient time prior to use, be formed about a mandrel so as to define a circular configuration suitable for use as a pipe coupler. The extrudate 33 and/or the mandrel are heated so as to facilitate such forming.

Figure 4:
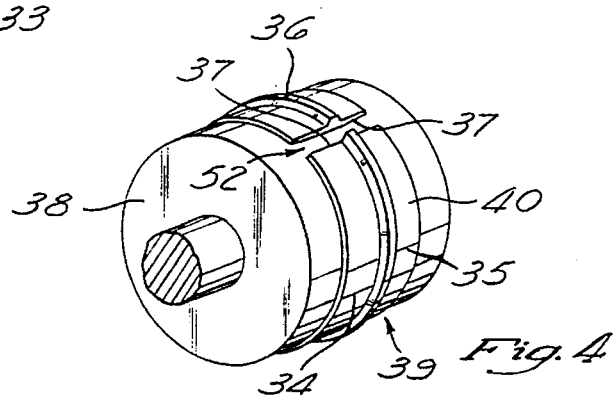
FIG. 4 is a perspective view of a portion of the length of extrudate of FIGS. 2 and 3 which has been cut to a length slightly less than the inside circumference of a pipe section which is to be coupled therewith, shown wrapped around a forming mandrel such that it is formed into a circular configuration prior to cooling.

Referring now to FIG. 4, the length of extrudate 33 is cut such that when installed within the interior of the pipes to be coupled, the ends 37 thereof do not contact one another, but rather form a gap 52 therebetween. By limiting the length of the coupling to somewhat less than the inner circumference of the pipes to be coupled thereby, easy installation thereof is facilitated. Further, according to the present invention, a tight fit and reliable coupling is also provided as discussed in detail below.

The cut section of extrudate 39 is wrapped around a mandrel 38. The mandrel 38 has a diameter such that a coupling having an outer diameter approximate to that of the inner diameter of the pipe sections to be coupled thereby is formed. The cut section of extrudate 39 is wrapped about the mandrel 38 while still at a sufficient temperature to remain formable and remains about the mandrel 38 until set or sufficiently rigid to maintain the curved configuration afforded thereby.

Referring now to FIG. 5, a shelf 42 is optionally formed to the inner surface 43 of the cut and formed section of extrudate 39 to form coupler 50. The shelf 42 is preferably attached at one end 37 of the cut and formed section of extrudate 39 via fasteners, adhesive bonding, thermal or ultrasonic welding, etc. Those skilled in the art will appreciate that various different means for attaching the shelf 42 to the cut and formed section of extrudate 39 are likewise suitable. The shelf 42 extends a sufficient distance from the end 37 of the cut and formed section of extrudate 39 to which it is attached such that, when installed, the shelf 42 passes under or overlaps the opposite end 37 thereof (as shown in FIG. 9). The shelf 42 is either formed to have a curvature approximate to that of the cut and formed section of extrudate or is sufficiently flexible to attain such curvature.

Referring now to FIGS. 6 and 7, during storage of the pipe coupler 50 of the present invention, the coupler 50 may be compressed or decreased in diameter by overlapping the ends 37 thereof (as shown in FIG. 6). Thus, the storage volume of the coupler is desirably reduced. Additionally, such reduced diameter is maintained as the coupler 50 is inserted into a first pipe section 32 (as shown in FIG. 7) to be joined therewith. Such reduced diameter facilitates easy installation of the coupler 50 into the first pipe section 32. The coupler 50 is inserted into the first pipe section 32 such that the second planar surface 35 is substantially fully inserted into the first pipe section 32 and the ridge 36 abuts the end of the first pipe section 32.

Referring now to FIGS. 8, 9, and 11, once the coupler 50 has been inserted into the first pipe section 32, it is expanded, preferably via a turnbuckle type expansion device, until the second planar surface thereof firmly contacts the inner surface of the first pipe section 32. An adhesive bonding agent and sealant is first applied to either the second surface 35 of the coupler 50 or the inner surface of the first pipe section 32 so as to maintain such contact once the expansion device is removed. The adhesive bonding agent is similarly applied to either the first planar surface 34 of the coupler 50 or to the second pipe section 37. The second pipe section 37 is then slid over the exposed portion of the coupler 50. Those skilled in the art will appreciate that various different methods for attaching the coupler 50 to the first 32 and second 37 pipe sections are suitable. For example, the coupler 50 may alternatively be firmly or ultrasonically welded to the first 32 and second 37 pipe sections. Alternatively, fasteners, i.e., rivets, screws, etc., may be utilized to attach the coupler 50 to the first 32 and second 37 pipe sections, as desired. Any combination of such attachment methods may be utilized, as desired.

A gap 52 is formed intermediate the two ends 37 of the coupler 50 after the coupler 50 has been fully expanded, due to the shorter length of the cut and formed section of extrudate 39 as compared to the inner circumference of the first 32 and second 37 pipe sections.

Referring now to FIG. 10, the gap 52 is filled in with a suitable grout or adhesive material. Those skilled in the art will appreciate that various such materials are suitable. For example, the fill material 56 may comprise a polymer material, preferably containing a substantial quantity of the same polymer from which the coupling 50 is formed.

Figure 12:
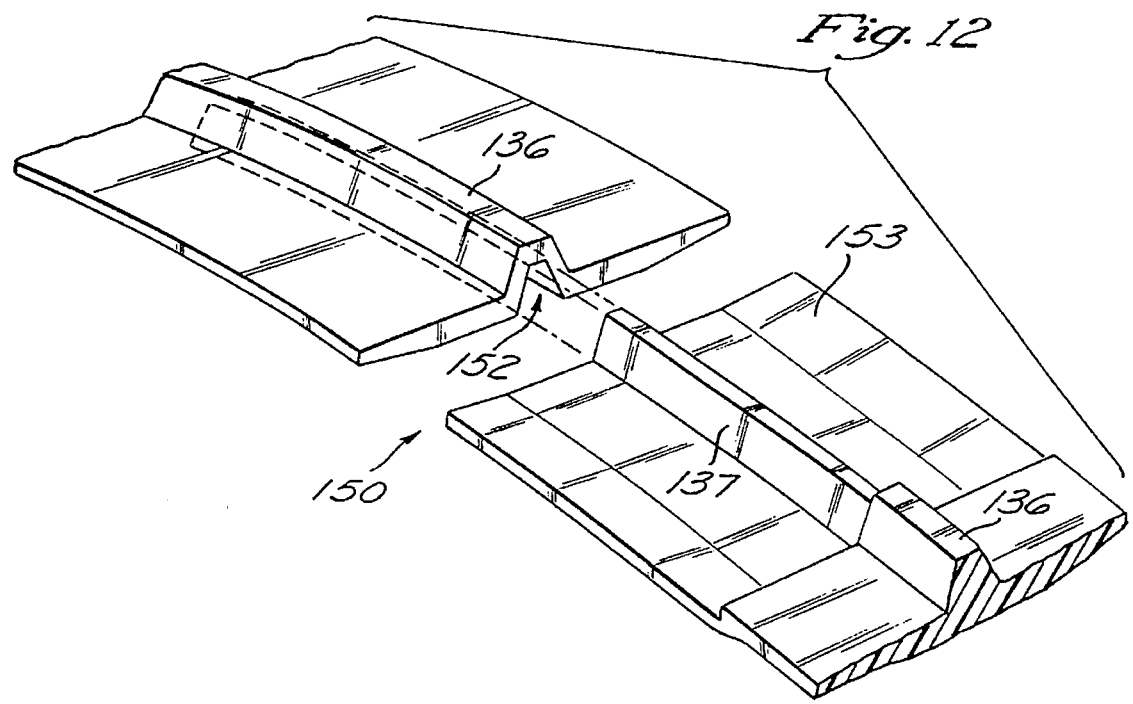
FIG. 12 is an enlarged perspective view of the ends of an alternative embodiment of the pipe coupler wherein a section of the ridge at one end thereof has a recess formed therein so as to receive the ridge formed at the other end thereof to facilitate collapsing or compression of the pipe coupler, so as to reduce its diameter and allow it to easily be inserted within a section of pipe to be coupled therewith, an optional shelf having a ridge formed thereon is also shown, wherein the ridge of the optional shelf fits into the recess when the pipe coupler is installed in a pipe.
Figure 13:
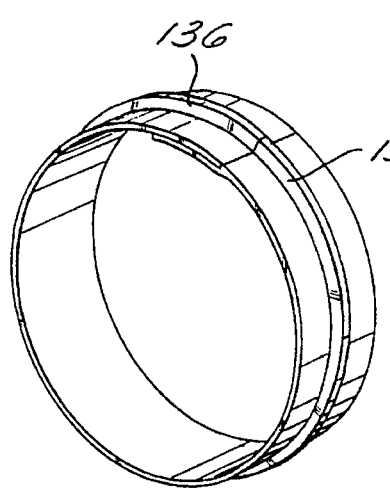
FIG. 13 is a perspective view of the entire pipe coupler of FIG. 12 as it is configured after installation thereof.
Figure 14:
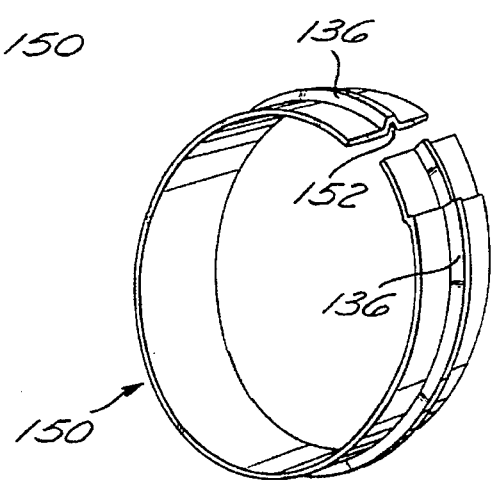
FIG. 14 is a perspective view of the entire pipe coupler of FIG. 12.

Referring now to FIGS. 12–14, an alternative embodiment of the coupler 150 is shown. The alternative embodiment of the coupler 150 is similar to the coupler illustrated in FIGS. 5–10 with the exception that the optional shelf 153 has a ridge 137 formed thereon and a recess 152 is formed within the ridge 136 and extends a short distance from one end thereinto. The recess 152 extends a sufficient distance into the ridge 136 to facilitate overlapping of the two ends of the coupler 150 in a manner that reduces the diameter thereof sufficiently to facilitate insertion thereof within one of the pipe sections being coupled therewith. Generally, for a coupler 150 configured for coupling pipe sections three feet in diameter, the recess is configured to extend between 6 and 24 inches into the ridge 136, preferably approximately 12 inches thereinto. Those skilled in the art will appreciate that lesser distances are required for smaller diameters of pipe and greater distances are required for longer diameters of pipe. Those skilled in the art will appreciate that different means for removing material from the end of the coupling 150 are suitable. For example, the material may be moved, ground, or cut from the ridge.

Alternatively, the recess 152 may be formed during the extrusion process and extend the entire length of the ridge 136.

To use the pipe coupler shown in FIGS. 12–14, the pipe coupler is compressed so as to reduce its diameter by inserting the ridge 136 formed upon one end thereof into the recess 152 formed upon the other end thereof. This reduces the diameter of the pipe coupler 150 sufficiently that it may easily be inserted into one of the pipes to be coupled therewith- The pipe coupler 150 may then be expanded by withdrawing the ridge 136 from the recess 152, thus expanding the pipe coupler 152 to its full diameter. The pipe coupler illustrated in FIGS. 12–14 may thus be utilized in a manner similar to that of the pipe coupler illustrated in FIGS. 5–10.

The shelf 153 is optional and provides a means for maintaining grout intermediate the two opposed ends of the coupling, as discussed above.

Thus, a methodology and apparatus are provided for diverting polymer material from the first extruder 24 to a second extruder 26 when the metal stock 30 onto which the first extruder 24 applies polymer is exhausted or when an equipment malfunction occurs which requires stoppage of the pipe forming process. Such diversion of the polymer facilitates maintenance of the flow rate from the extruder screw 14 such that the polymer does not either overheat or cool undesirably. This eliminates the need to shut down the extruder screw 14 and the consequent subsequent need to re-establish the proper flow of polymer therethrough once the pipe forming process resumes. The need to repelletize unused polymer is also eliminated, It is understood that the exemplary polymer diverter system for metal pipe having an integrally formed polymer liner described herein and shown in the drawings represents only a presently preferred embodiment of the invention. Indeed, various modifications and additions may be made to such embodiment without departing from the spirit and scope of the invention. For example, the present invention may be utilized in a wide variety of different manufacturing processes. Indeed, the methodology of the present invention may be utilized to form a variety of different desired articles. Thus, these and other modifications and additions may be obvious to those skilled in the art and may be implemented to adapt the present invention for a use in a variety of different applications.

What is claimed is:

1. A method for applying polymer to metal, said method comprising the steps of:
    a) pumping heated polymer to an applicator;
    b) applying the heated polymer to the metal via the applicator;
    c) upon encountering a lack of metal to which the polymer is to be applied, diverting the pumped, heated polymer from the applicator; and
    d) utilizing the diverted polymer to form a splice for attaching two pieces of metal together.

2. The method as recited in claim 1 wherein the heated polymer is pumped to the applicator via an extruder screw.

3. The method as recited in claim 1 wherein the applicator comprises an extrusion die.

4. A method for applying polymer to metal pipe during a pipe forming process, said method comprising the steps of:
    a) pumping heated polymer to an extrusion die;
    b) extruding the heated polymer onto the metal pipe;
    c) upon encountering a lack of metal pipe onto which to extrude further polymer, diverting the pumped heated polymer from the extrusion die; and
    d) utilizing the diverted polymer to form a splice for attaching two sections of pipe together.

5. The method as recited in claim 4 wherein the heated polymer is pumped to the extrusion die via an extruder screw.

6. The method as recited in claim 4 wherein the heated polymer is extruded onto the inside of the metal pipe.

7. A method for forming polymer coated pipe and polymer couplings for attaching sections of such pipe together, said method comprising the steps of:
    a) pumping heated polymer to a first extrusion die;
    b) extruding the heated polymer from the first extrusion die onto the metal pipe;
    c) upon encountering a lack of metal pipe onto which to extrude further polymer, diverting the pumped heated polymer from the first extrusion die to a second extrusion die;
    d) extruding the heated polymer from the second extrusion die so as to form a length of polymer material;
    e) cutting the length of polymer material to less than a inner circumference of the pipe; and
    f) wrapping the cut length of polymer material around the mandrel while it is still hot enough to be formed into a generally circular shape thereby.

* * * * *